(12) United States Patent
Oro

(10) Patent No.: US 9,292,863 B2
(45) Date of Patent: Mar. 22, 2016

(54) REPRESENTATIVE KEYWORD SELECTION

(71) Applicant: YAHOO! INC., Sunnyvale, CA (US)

(72) Inventor: Norman Oro, Pasadena, CA (US)

(73) Assignee: YAHOO! INC., Sunnyvale, CA (US)

( * ) Notice: Subject to any disclaimer, the term of this patent is extended or adjusted under 35 U.S.C. 154(b) by 69 days.

(21) Appl. No.: 13/912,372

(22) Filed: Jun. 7, 2013

(65) Prior Publication Data

US 2013/0290100 A1     Oct. 31, 2013

Related U.S. Application Data

(63) Continuation of application No. 11/928,657, filed on Oct. 30, 2007, now Pat. No. 8,463,779.

(51) Int. Cl.
*G06F 17/30* (2006.01)
*G06Q 30/02* (2012.01)

(52) U.S. Cl.
CPC ...... *G06Q 30/0256* (2013.01); *G06F 17/30864* (2013.01); *G06Q 30/02* (2013.01)

(58) Field of Classification Search
CPC .................. G06F 17/30864; G06Q 30/0256; G06Q 30/02

USPC .......................................................... 707/728
See application file for complete search history.

(56) References Cited

U.S. PATENT DOCUMENTS 7,260,568 B2 *   8/2007   Zhang et al. ................... 707/711
7,603,342 B2 *   10/2009  Gosse et al.

* cited by examiner

*Primary Examiner* — Huawen Peng
(74) *Attorney, Agent, or Firm* — James J. DeCarlo; Greenberg Traurig, LLP

(57) ABSTRACT

Systems and methods in clued those for serving one or more advertisements contextually-relevant to an initial web page. Terms are selected from the initial web page that may be used as representative keywords to select advertisements that are contextually relevant to the initial web page. Keyword candidates are filtered via a series of operations that include: querying a network for web pages where the one or more keyword candidates are found, filtering the web pages based on time/date characteristics and a pre-defined number of web pages, analyzing the web pages using the one or more keyword candidates, and selecting certain keyword candidates to be representative keywords based on the analysis. The one or more representative keywords may be used to select one or more advertisements that may then be served with the initial web page.

18 Claims, 5 Drawing Sheets

REPRESENTATIVE KEYWORD SELECTION

This application is a continuation of and claims priority from co-pending U.S. Pat. Application Ser. No. 11/928,657 filed Oct. 30, 2007, entitled representative keyword selection, the entire contents of which are hereby incorporated by reference.

BACKGROUND

Numerous search engines use keywords to determine whether web pages are relevant to a set of search terms. Advertisers provide search engines with custom advertisements and associated keywords so that when a search is performed using an advertiser's keyword(s) as search terms, the advertiser's advertisement may be displayed next to the search results.

SUMMARY

Systems and methods are disclosed herein for selecting at least one representative keyword to serve contextually-relevant advertisements to an initial web page. One or more keyword candidates are selected from the initial webpage. Keyword candidates may be selected based on, for example, the frequency of appearance in the initial webpage, or the selection of proper nouns in the initial web page. Each keyword candidate may be used as a search term in a query using a search engine, such as is often performed on the YAHOO! or GOOGLE Internet search engines. A set of query results, often summaries and links to web pages, are returned for each query. For web pages accessible via a set of query results, the frequency of occurrence of each keyword candidate appearing in each web page is identified. This operation is repeated for each set of query results. From this analysis a ranking may be assigned to each keyword candidate, and from this ranking one or more representative keywords may be selected from the keyword candidates. The one or more representative keywords are used to select one or more advertisement served on or along with the initial web page.

One aspect of the disclosure is a method for selecting one or more advertisements that are contextually relevant to an initial web page. The method comprises receiving a request for an advertisement, and selecting one or more keyword candidates from the initial web page. A first query of a network for web pages containing a first keyword candidate is performed. A quantity of web pages of a first set of web pages returned by the first query are analyzed. One or more keyword candidates are selected as the one or more representative keywords. This selection is based on results of the analyzing operations that were performed on the first set of web pages. One or more advertisements are selected using the one or more representative keywords.

Another aspect is a method for selecting and serving one or more advertisements that are contextually relevant to an initial web page. The method comprises receiving an advertisement request associated with an initial web page. One or more keyword candidates are selected from the initial webpage. A network is queried for web pages that include the one or more keyword candidates, and results of the querying operation are analyzed. One or more keyword candidates are selected as one or more representative keywords based on the analyzing operation, and at least one advertisement based on the representative keyword is selected. The at least one advertisement is served with the initial web page.

Another aspect is a method for selecting one or more representative keywords. The method comprises selecting one or more keyword candidates, and querying a network for web pages that include the one or more keyword candidates. The one or more keyword candidates are selected as one or more representative keywords based on results of the querying operation.

The disclosure further describes a system capable of selecting and serving one or more advertisements that are contextually relevant to an initial web object that the advertisement is served with. The system comprises an ad control system that receives an advertisement request associated with an initial web object. An ad control subsystem selects one or more keyword candidates from the initial web object. A query subsystem instructs an Internet search engine to query for web pages that include the one or more keyword candidates. An analysis subsystem analyzes the results of the query, and selects at least one of the keyword candidates as at least one representative keyword based on the analysis operation. An ad instruction subsystem instructs an ad engine to select one or more advertisements based on the one or more representative keywords, and instructs an ad server to serve the one or more advertisements with the initial web object.

The disclosure further describes a computer readable medium for instructing various computing devices and/or servers to select and serve one or more advertisements that are contextually relevant to an initial web object that the one or more advertisements are served with. The computer readable medium comprises computer code for selecting one or more keyword candidates by scanning an initial web page and selecting all capitalized words. A date stamp is selected from the initial web page, and based on the date stamp, a date range is defined. A query is performed via an Internet search engine wherein the query's search terms are the one or more keyword candidates. The querying operation is repeated for each keyword candidate. A set of query results is received for each querying operation. A date is selected for each web page in each set of query results. The query results are filtered such that only query results with dates that fall within the date range are returned. The query filters results such that only the N most-relevant query results are returned for each query. The filtered query results are analyzed to determine a ranking of keyword candidates, and one or more representative keywords are selected based on the ranking of keyword candidates.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the teachings set forth in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments of systems and methods described below and are not meant to limit the scope of the disclosure in any manner, which scope shall be based on the claims appended hereto.

DETAILED DESCRIPTION

Systems and methods are herein disclosed for selecting keyword candidates from an initial web page where one or more advertisements (hereafter referred to as an ad) are to be served. The keyword candidates are used in a query of a network in order to evaluate each keyword candidate and determine the one or more keyword candidates that are representative of the initial web page. The one or more representative keyword candidates may be selected as the one or more representative keywords. These one or more representative keywords may be used to select or generate one or more ads. The ad engine may also return the one or more ads to be served along with the initial web page.

Figure 1:
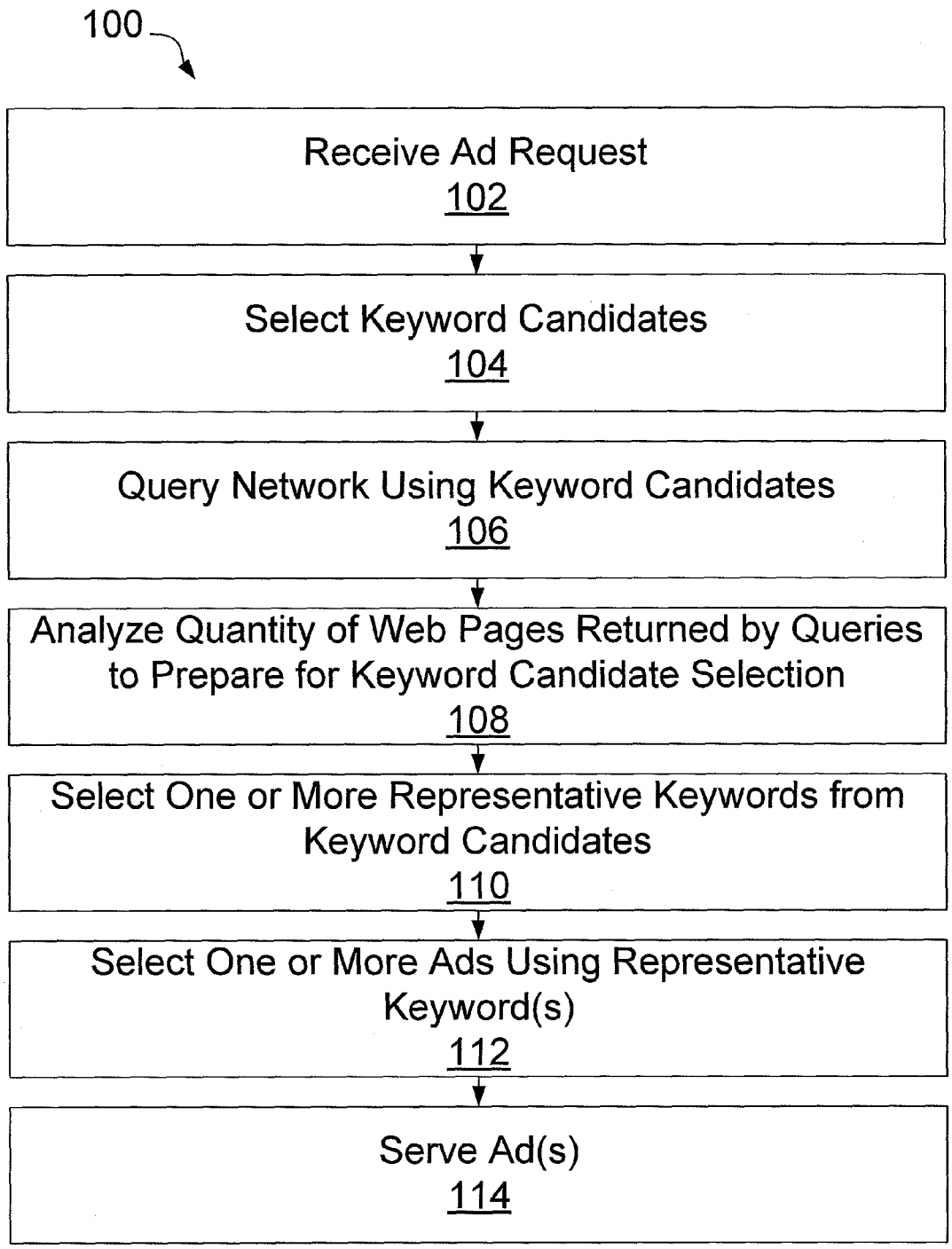
FIG. 1 illustrates an embodiment of a method for serving contextual advertisements.

FIG. 1 illustrates an embodiment of a method for serving contextual ads. As used herein the term initial web page means an electronic document, whether static or dynamically created, typically a web page, that is being served, is about to be served, or may be served at some future point. The initial web page is intended to be served with one or more ads. In order to improve the chances that a web page viewer will notice the one or more ads and/or select the one or more ads or one or more hyperlinks associated with the one or more ads, the one or more ads are selected such that they contextually reflect or relate to the content of the initial web page. The method 100 illustrates an example of a method for selecting and serving one or more such contextually-relevant ads. The method 100 receives a request for one or more ads to serve with the initial web page, selects at least one keyword candidate from the initial web page, queries a network using the at least one keyword candidate, analyzes the returned query results, ranks the at least one keyword candidate in terms of contextual relevance to the initial web page, selects one or more representative keywords from the ranked keyword candidate(s), selects one or more contextual ads using the one or more representative keywords, and serves the one or more ads with the initial web page.

The method 100 includes a receive ad request operation 102. An ad request is electronic data capable of initiating processes that generate or lead to retrieval of an ad to be served with a web page or other media object. Receipt of the ad request may immediately initiate other processes, or the ad request may be stored on a computing device allowing other processes to be initiated at a later time. Although the receive request operation 102 may occur at any point during the method 100, in one embodiment, the receipt of an ad request initiates the other operations of the method 100.

In the illustrated embodiment, the ad request is followed by a select keyword candidates operation 104. Keyword candidates are selected from the initial web page. Any number of keyword candidates may be selected including a single keyword candidate. Selection may be carried out by the same system as the one that received the ad request operation 102 or may execute on a separate system, or by different processes running on the same, different, or multiple systems. Once selected, keyword candidates may exist as digital representations stored on a computer readable medium. One end goal of the method 100 is to produce at least one representative keyword used to select one or more ads that are contextually relevant to the initial website. In order to do this, an initial pool of keyword candidates must be selected, and from this pool the method 100 selects the one or more representative keywords. A keyword candidate is text selected from the initial web page, where the keyword candidate text may include characters, numbers, symbols, words, names, multiple words, phrases, or full sentences.

In the select keyword candidates operation 104 an algorithm is used to select one or more keyword candidates from the initial web page. In one embodiment the algorithm searches for proper nouns—words that begin with an uppercase letter. Other algorithms may be used instead of the proper noun algorithm, such as selecting words that match a preselected list of words, names associated with certain professions or affiliations, gender based names, names of sport, names of products or product types, for example. These algorithms may also be implemented in parallel or series with the proper noun algorithm. For instance, the proper noun algorithm may return too few keyword candidates, so one of the other above-mentioned algorithms may then be implemented. An example of a preferred algorithm may be presented if we first look at a fictitious blog entry as follows: "I was driving home in my new Ford Mustang when something occurred to me. The NBA championships are on. Tim Duncan versus LeBron James. I have to admit, I think it's going to go down to the wire. You have two of the best players in the United States playing. The thing is, I am a Cleveland native, so I have to go with my Cavaliers and James, but we'll see." Using the proper noun algorithm, keyword candidates might include "I," "FORD," "MUSTANG," "FORD MUSTANG," "NBA," "Tim," "Duncan," "Tim Duncan," "LeBron," "James," "LeBron James," "United," "States," "United States," "The," "Cleveland," "Cavaliers," and "Cleveland Cavaliers." The algorithm may include a feature that removes common unwanted keyword candidates such as "I," and "The."

In another embodiment, the keyword candidates are selected from the most frequently appearing proper nouns. Given the blog entry above, the algorithm would select "LeBron," "James," and "LeBron James" as the keyword candidates because they each appear twice whereas all other proper nouns appear only once. Alternatively, the algorithm may select the most frequently appearing text. In another embodiment, text recognition software may allow keyword candidates to be selected from text in images or video on the initial web page or in a media player associated with the initial web page.

Combinations of these algorithms may also be implemented. For instance, the select keyword candidates operation 104 may search for frequently appearing text as well as proper nouns. The algorithm may also use a weighted comparison of the most frequently appearing text as well as proper nouns. In another embodiment, the one or more keyword candidates may be selected via a weighted assessment of the locations where frequently appearing text or proper nouns are found. For instance, text found in the title or other headings on a web page may receive a heavier weighting than text found in the body of a news article. Other variations are also possible, and representative keyword selection algorithms known in the art may also be used.

The method 100 may also include a query network using keyword candidates operation 106. A query is the operation of searching for documents or web pages that meet certain search criteria and returning web pages or documents that meet the search criteria. Although the remainder of this disclosure refers to queries that return web pages, it should be understood that a query may also return links to web pages, components of web pages, images of web pages, documents residing on servers, documents residing on web pages, or other elements of a web page. The most common search criteria are search terms in the form of text. For instance, a user may enter the search terms "LeBron James" into a query, and the query may return web pages containing the words "LeBron," "James," and/or "LeBron James." On the other hand web pages may be returned in which "LeBron" and "James" are both contained in those web pages, but not necessarily in that order or even adjacent to each other. Other criteria include date range, time, and file type. For instance a query may only search for web pages identified as being created or last modified within a particular date range or time range and also containing the search terms. In another example, a query may search for web pages containing images associated with the search terms. This disclosure describes that any combination of criteria, either herein disclosed or otherwise imaginable, could be used.

In addition to searching for web pages a query may also return web pages. Returning web pages may also include accessing web pages, making copies of the web pages, and making the copied versions of the web pages available for further processing. Returning web pages may also include noting an address of each web page and providing this address to the next operation of the method 100 for further processing. For instance, the Internet search engine GOOGLE returns hyperlinks as search results, where the hyperlinks are accompanied by segments of text either describing or quoting the web pages from which they were derived. Returned web pages may also be ordered or ranked. One way of doing this is to assign different weights to multiple search criteria. For instance if a query includes two criteria, search terms and a date range, then the query may search for web pages containing the search terms, and return web pages ordered by how well they match the date range. Or, if two terms are entered as search terms, then the query may search for both terms, but rank web pages higher if they contain the first search term.

Having defined a query the process returns to query operation 106. In an embodiment, search terms are the sole criteria. A query is performed using each keyword candidate as a search term. For each query, the returned one or more web pages are referred to as a set of query results. So, given ten keyword candidates, ten queries may be performed, and ten sets of query results may be returned.

The returned quantity of web pages or query results may then be analyzed in an analyze quantity of web pages returned by queries operation 108. The quantity of web pages may include one or more web pages. The operation 108 seeks to determine how well each keyword candidate reflects the content of the initial web page. In one embodiment this is done by analyzing each set of query results and identifying web pages in which keyword candidates appear. So, while each query searched for a single keyword candidate, the analysis operation 108 identifies all the keyword candidates as they appear in the query results. This analysis provides a way to rank the keyword candidates in terms of their ability to represent the initial web page. Two embodiments of the analysis operation 108 will be discussed in further detail herein below with reference to FIG. 4 and FIG. 5.

Based on the analysis operation 108, one or more keyword candidates may be selected as representative keywords in a select representative keyword operation 110. For instance, if the keyword candidates are ordered in terms of relevance to the initial web page, as determined in the analysis operation 108, then the selection operation 110 may select the three most relevant keyword candidates to be representative keywords. One or more keyword candidates may be selected as representative keywords. The difference between representative keywords and keyword candidates is in syntax only. Representative keywords are those keyword candidates selected to be provided to a system capable of selecting one or more ads based on the representative keyword. Representative keywords are selected because of the impracticality and lack of accuracy that would result from using all keyword candidates to select an ad. This does not mean, however, that the selection operation 110 cannot be skipped in an embodiment.

Having selected one or more representative keywords, the one or more representative keywords may be used to select an ad in the select ad using representative keyword operation 112. In one embodiment, a list of pre-defined representative keywords are associated with a repository of ads. For instance, a FORD truck ad may be associated with the pre-defined representative keywords, "FORD," "truck," and "heavy load." If the selection operation 110 provides representative keywords matching any of these three pre-defined representative keywords, then the select ad operation 112 may select the FORD truck ad using a simple representative keyword-matching algorithm. Every ad may be associated with one or more pre-defined representative keywords or combinations of pre-defined representative keywords. If associated with multiple pre-defined representative keywords, the association may be weighted. For instance, and continuing to use the FORD truck ad, the "truck" pre-defined representative keyword may be given the most weight, and the "heavy load" pre-defined representative keyword may be given the least weight. Another ad for a weight loss product may be associated with the pre-defined representative keywords "heavy load," "confidence," "and weight loss." With this ad, the pre-defined representative keyword "heavy load" may be given the greatest weight. Given the representative keyword "heavy load," the select ad operation 112 may have to choose between the two ads since they both are associated with the pre-defined representative keyword "heavy load." However, since the weight loss ad gives more weight to the pre-defined representative keyword than does the FORD truck ad, the weight loss ad would be selected. In one embodiment, the price per click that advertisers are willing to pay may be used as a weight for selecting ads.

Ads may also be associated with dates, specific orders of pre-defined representative keywords, groups of pre-defined representative keywords, and other criteria. For instance, the representative keyword "September 11" may be associated with ads for American flags or ads for firemen calendars.

Ads may be served in a variety of manners. For instance, ads may be pop-up ads where a separate web browser window opens to display an ad. Ads may be incorporated into the graphical user interface of a web browser. Ads may be incorporated into the initial web page content. Ads may also be incorporated into a media player graphical user interface. Ads may take the form of audio, video, slide shows, images, text and any combination of the aforementioned forms.

In an embodiment, an additional criterion used to select ads may be the geographic location of the user. Determining this location may be done via analyzing the user's internet protocol (IP) address, or by accessing information regarding the data routing on the network. Alternatively, if a user has a profile or user data accessible by the service provider, that information could also be used.

Upon selecting an ad, the method 100 serves the ad in a serve ad(s) operation 114. The one or more ads may be served either subsequent to serving the initial web page or along with the process of serving the initial web page. Serving includes rendering the one or more ads or making them visible to a user. Serving may include displaying visual elements that are static or dynamic as well as presenting audio data via a user device's audible components. Serving may also include communicating data to the user's computing machine where the computing machine displays the one or more ads using the data. Such data could include a universal resource identifier or address identifying a network location where the one or more ads may be obtained from.

It should also be understood that representative keywords do not have to be derived from web pages. They can also be derived from web objects. Web objects include web pages, media player content, images, videos, audio files, and slide shows. Image recognition software may, in an embodiment, allow representative keywords to be selected based on images found in web pages or documents found on servers. Image clips of video may be taken and analyzed to determine representative keywords such that relevant ads may be served with videos. Alternatively, source code used for rendering media may be scanned in order to determine representative keywords. Representative keywords may also be selected from audio files such as MP3, streaming audio, or audio rendered in conjunction with video. In this same vein, ads may be selected based on an initial web page, but then served with media content. For instance, some online video players open as a web page or media player separate from the original web page in which the media was requested. Thus, at least one representative keyword may be selected from the original web page and one or more ads served with the separate web page or media player.

Representative keywords need also not be selected from a single initial web page. In an embodiment a user may be accessing a first web page, and then via a link on the first web page access a second web page that renders in a second window or web browser. Since the two pages may have contextual similarity, representative keywords may be selected from both web pages and one or more ads may be selected and served based on these representative keywords. Also, representative keywords selected from the most recently viewed web page may be given greater weight in selecting the one or more ads.

It should be understood by those skilled in the art that the order of the operations in method 100 are not limited to those herein disclosed. Rather, other combinations of these methods may also be implemented, and in some embodiments not all of the disclosed methods may be executed. For instance, there may be a large number of keyword candidates, and as such it may be desired to have different operations running simultaneously. For example, when the first query results begin to be returned from the query operation 106, the operation 106 may continue to run while the analyze operation 108 begins on the query results that have been returned. In another example, operations 104, 106, 108, 110, and 112 may continually or periodically execute until an ad request is received. Once a request is received, the one or more ads may be served. For instance, ads could be selected for popular web pages and cached or stored. When an ad request is received for one of these web pages, one or more ads could be quickly retrieved and served without the delay that may be associated with performing the entire method 100.

Those skilled in the art will also recognize that the method 100 is only one embodiment for selecting representative keywords, and that other applications of representative keywords may also be implemented. For instance, representative keywords may be used by ad networks or ad exchanges in order to group content. Content providers may include certain representative keywords in their content in order to receive more relevant hits or generate advertiser-relevant content when their content is added to an ad network or an ad exchange.

Figure 2:
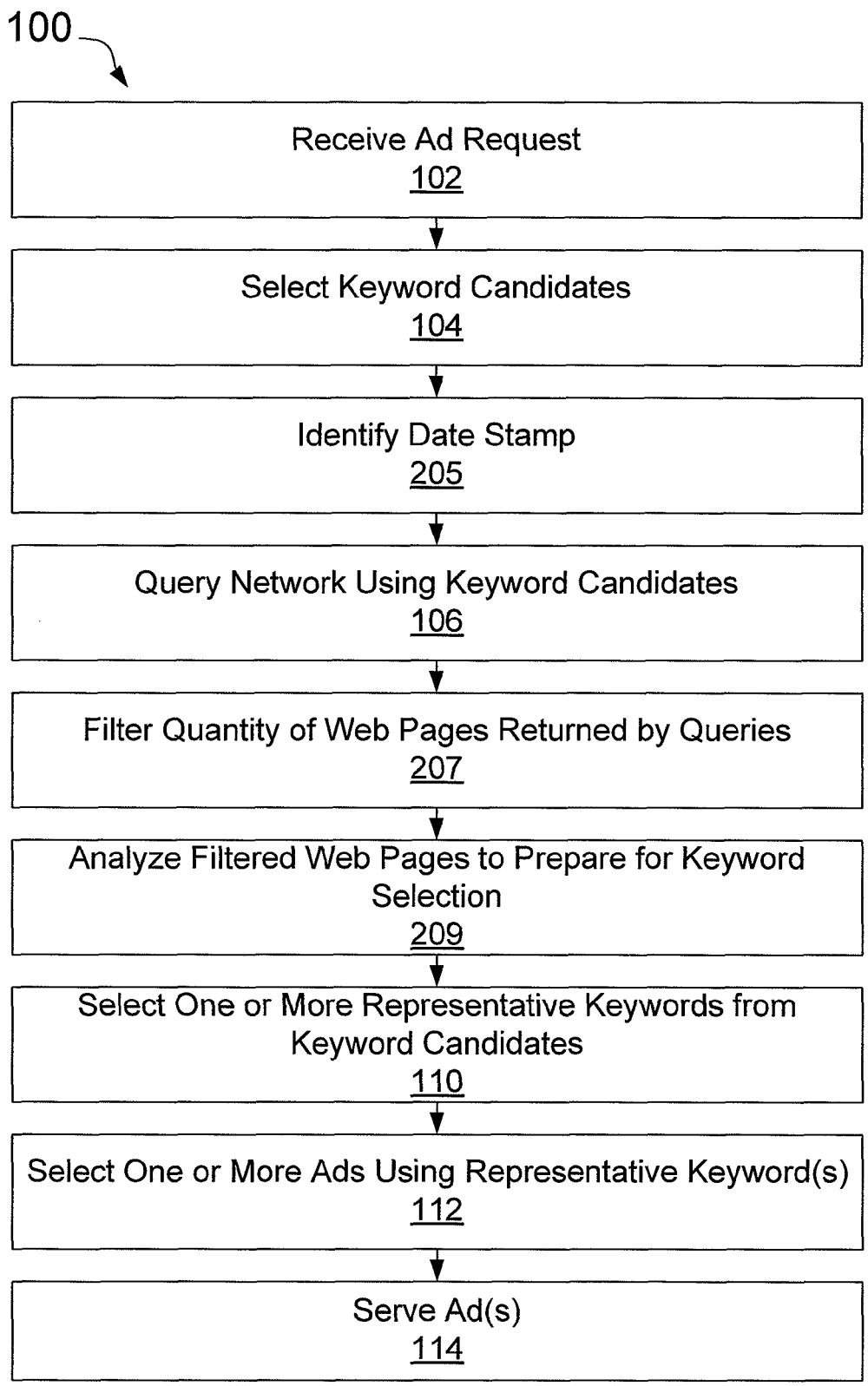
FIG. 2 is an alternative embodiment of the method described in FIG. 1.

FIG. 2 is an alternative embodiment of the method described in FIG. 1. In this embodiment query results may be filtered before analysis in a filter operation 207. In an embodiment, filtering considers the timeliness of a query result relative to the initial web page. An identify date stamp operation 205 identifies a date stamp from the initial web page. The date stamp is a data object associated with the initial web page that indicates when the initial web page was last modified. Alternatively, the date stamp may indicate the publication date of a web page or blog. Such date stamps may be found by searching the source code of the web page. A date stamp may also be identified from the text of the web page. For instance, news articles and blog entries often have a date near the heading of an article. If not in the heading, dates often appear in the text of an article. These dates may be selected as the date stamp.

In the filter operation 207, query results that do not contain a date that is the same as the date stamp may be filtered out. Alternatively, a date range may be selected relative to the date stamp. For instance, if the date stamp for a given web page is Jan. 1, 2007, the date range may be selected to be one week earlier than the date stamp and one week later than the date stamp. Query results with dates that fall within this two week range would be returned while others would be filtered out. In this manner the filter returns only the most timely query results, thus improving the speed of the method 100 and improving the relevance of the selected representative keyword.

Variations on the date ranges disclosed may also be used. For instance, given a date stamp of Sep. 3, 2007, a date range may be Sep. 1, 2007, to Sep. 5, 2007, or Sep. 3, 2007, to the date when the operation is being carried out. The date range may utilize larger units of time such as weeks, or may use smaller units such as hours, minutes, or seconds. For instance, a date range may be the date stamp plus or minus 12 hours.

Another means for filtering reduces the number of query results to a pre-defined number N, where N is any positive integer. N may be selected in order to balance the relevance of served ads with the speed with which the method 100 can be performed. If N is a small number, such as three, then only three query results for each keyword candidate will be returned, and the method 100 will proceed quickly. However, only analyzing three results may lead to serving an ad that does not have the same relevance as an ad served after analysis of 1000 query results. The drawback with analyzing 1000 query results is that the time required for the method 100 to complete will be greater.

The integer N may be set as a constant and applied to all queries. Alternatively, N may be based on an algorithm that varies the N used in a query based on any number of factors. For instance, it may be found that a class of users referred to as class A users, are more patient than class B users. As such, selecting and serving an ad for class A users may take half a second longer than the process used when class B users are being served an ad. Thus, given a class A user, when filtering ads N may be a larger number than the N used when dealing with class B users. The filtering may take longer, but the ad will likely be more relevant.

The filter query results operation 207 may also filter query results based on a category. A category may include popular people, food, cars, news, recent news, political commentary, and others. Thus, the one or more web pages returned in a query may be accessed and analyzed to determine the category of each web page. Based on the category that each web page falls into, only web pages falling within a prescribed category or categories may be returned. In one embodiment, categories would include various news categories, such as sports, politics, elections, weather, finance, and business.

In another embodiment, filtering includes consideration of timeliness and a pre-defined number of returned query results. For instance, an N-number of query results may be returned, assuming a class A user, and from those results only results in which the objective date falls within one week of the date stamp Sep. 7, 2007, will be returned. This example includes elements of filtering examples already mentioned, but it should be understood that any number of other date ranges and algorithms for assigning a value N may also be used. In another embodiment, filtering includes consideration of timeliness, a pre-defined number of returned query results, and category.

Since query results are filtered, the method 100 as illustrated in FIG. 2 only analyzes the filter results in an analyze filtered web pages operation 209. Again, web pages is defined as one or more web pages. Since fewer query results are analyzed after filtering, the analysis operation 209 may be faster than the unfiltered embodiment of FIG. 1. Otherwise this operation 209 is essentially the same as analysis operation 108 of FIG. 1.

Figure 3:
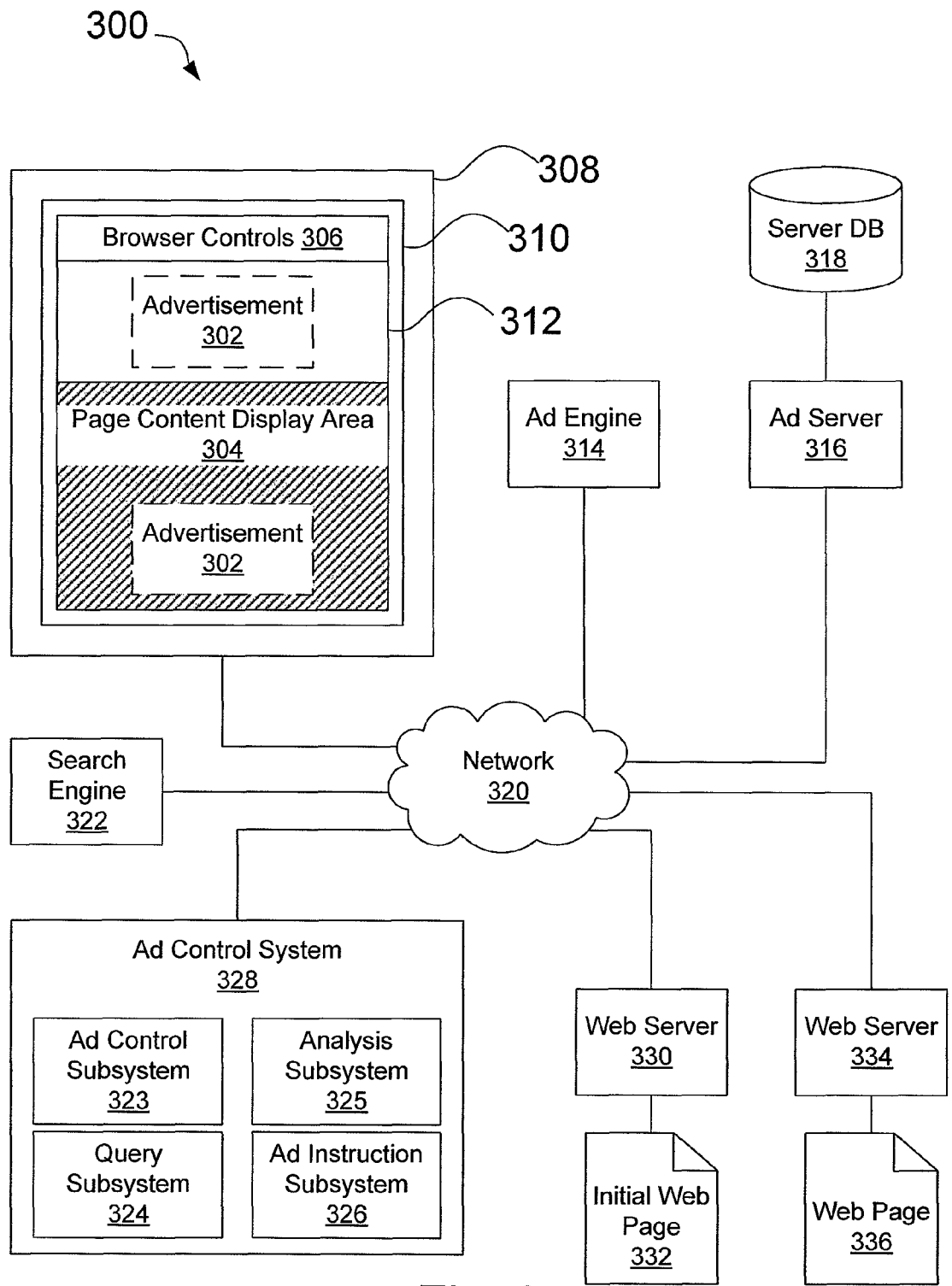
FIG. 3 illustrates an embodiment of a system capable of carrying out the disclosed methods.

FIG. 3 illustrates an embodiment of an automated system capable of carrying out the disclosed methods. Many of the systems and components are interconnected via a network 320, that may or may not be the Internet, an intranet, a wireless network, or some combination of the above. In one embodiment a request for an ad is generated by the web server 330, which is responsible for serving the initial web page 332. The request may be received by an ad control system 328 comprising an ad control subsystem 323, a query subsystem 324, an analysis subsystem 325, and an ad instruction subsystem 326. In an embodiment, the ad control subsystem 323 may select one or more keyword candidates from the initial web object. The query subsystem 324 may instruct an Internet search engine, or any system capable of querying a network, to query for web pages that include one or more keyword candidates. The analysis subsystem 325 may analyze the results of the query, and may select at least one of the keyword candidates as the representative keyword(s) based on the analysis operation. The ad instruction subsystem 326 may instruct an ad engine to select one or more advertisements based on the representative keyword(s), and may instruct an ad server to serve the one or more ads with the initial web object. The subsystems 323, 324, 325, 326 may be embodied in hardware, software, firmware, or any other medium able to carry out the disclosed methods. In another embodiment, an ad server 316 may receive the ad request and route the request to the ad control system 328.

The ad control system 328 selects one or more keyword candidates. The one or more keyword candidates may be selected from the initial web page 332, initial web page source code, media player, or other source being rendered or operating on a client machine 308. Data used to render or operate one of these elements on the client machine 308 may reside in temporary memory on the client machine where it may be accessed for the purpose of selecting keyword candidates. Alternatively, such data may reside on a web page server 330. In such an instance, the ad control system 328 may select one or more keyword candidates by accessing the web page server 330.

The ad control system 328 may also identify a date stamp from the initial web page 332. Again, the date stamp may be identified from data stored temporarily on the client machine 308 or from the data stored on the web server 330. The ad control system 328 may also query the network 320 using the one or more keyword candidates. Querying searches a web page 336 to see if the web page 336 contains any keyword candidates. If the web page 336 contains any keyword candidates, then the ad control system 328 either accesses the web page 336 or stores information regarding the web page, such as a hyperlink, that enables access to the web page 336 at a later time. Keyword candidates may be provided to the search engine 322 either sequentially in time or in parallel (i.e. simultaneously or non-sequentially). Alternatively, keyword candidates may be provided to multiple search engines simultaneously to improve the speed with which the query may execute. In an embodiment, the search engine 322 is an Internet search engine such as those provided by GOOGLE and YAHOO!.

For the purposes of this disclosure an engine is a software, hardware, or firmware (or combinations thereof) system, process or functionality that performs or facilitates the processes, features, and/or functions described herein (with or without human interaction or augmentation). The search engine in particular may accept search criteria, such as search terms and dates of publication, query a network for web pages meeting the search criteria, and return query results. Additionally, the ad engine in particular requests ads from an ad server, and may also route ads from the ad server to other systems.

The ad control system 328 selects representative keywords using one of the disclosed methods of ranking or analyzing and provides any representative keywords to an ad engine 314. The ad engine 314 selects an ad via the ad sever 316. The ad server controls access to an ad database 318 where ads and pre-defined representative keywords, and metadata associated with those ads may be stored. Metadata may include weighting algorithms for the pre-defined representative keywords, weighting values, and other data that may be used to match ads with representative keywords.

For the purposes of this disclosure an ad server is software, hardware, or firmware (or combinations thereof) capable of searching a database or other repository of ads to find one or more ads to serve on web pages and storing data. An ad server may be a single server or a group of servers acting together. An ad server selects ads to serve based on algorithms meant to match ads with web pages in which those ads will generate the most money for the entity employing the aforementioned algorithms. This can be an advertiser, an ad serving company (e.g. YAHOO!, GOOGLE), an ad exchange, or an ad network. At the same time ad servers must select ads that meet guidelines set by the web site and agreed to by the advertiser. The search engine, ad engine, ad control system and ad server may or may not be embodied as one system or as multiple parts of a distributed system, or as sub-systems of one or the other engines or systems described herein. A number of program modules and data files may be stored on a computer readable medium of the server. They may include an operating system suitable for controlling the operation of a networked server computer, such as the WINDOWS XP or WINDOWS 2003 operating systems from MICROSOFT CORPORATION.

For the purposes of this disclosure a computer readable medium stores computer data in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Upon selection of an ad the ad control system 328 may instruct the ad server 316 to serve the ad on the client machine 308. In another embodiment the ad control system 328 may request the ad from the ad server 316, and serve the ad on the client machine 308. Alternatively, the ad control system 328 may instruct the ad server 316 to provide the ad to the web server 330. The ad control system 328 may then instruct the web server 330 to serve the ad along with the initial web page 332.

In an embodiment the network may be an intranet (a private version of the Internet). An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP). In another embodiment, the network may comprise means for transferring data via a combination of an intranet and the Internet.

A client machine 308 operated by a user comprises a display 310. For the purposes of this disclosure, the client machine 308 is a computing device on which web pages and ads may be served. The client machine may comprise a display 310 where a user interface 312 may display controls 306, one or more ads 302, and web page content 304 associated with this disclosure. The one or more ads 302 are illustrated as being displayed either inside or outside of the web page content display area 304. However, the one or more ads 302 may also be located anywhere else within the user interface 312. In one embodiment, the one or more ads 302 may be displayed within the display 310, but separate from the user interface 312. Pop-up ads are an example of such an embodiment. During the course of executing method 100, the client machine 308 may communicate with various systems and devices via a network 320. The client machine may receive commands and data from, as well as transmit data and commands to, the ad server 316, the ad engine 314, the ad control system 328, and the web server 330.

For the purposes of this disclosure a computing device includes a processor and memory for storing and executing program code, data and software. Computing devices may be provided with operating systems that allow the execution of software applications in order to manipulate data. Personal computers, PDAs, wireless devices, cell phones, internet appliances, media players, home theater systems, and media centers are several non-limiting examples of computing devices.

Figure 4:
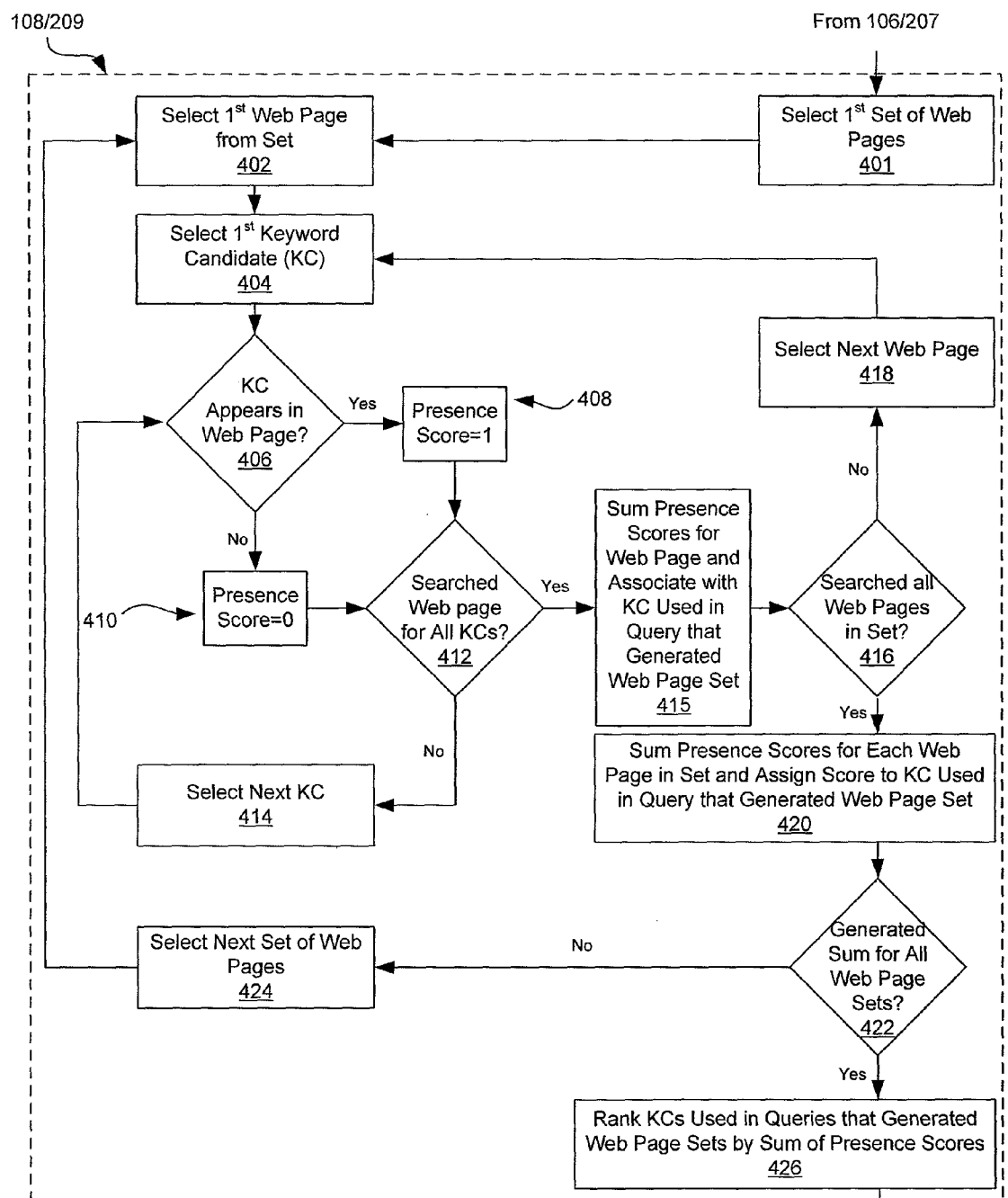
FIG. 4 illustrates an embodiment of a method for analyzing query results.

FIG. 4 illustrates an embodiment of a method for analyzing query results. The illustrated embodiment is a detailed embodiment of the analysis operation 108 referenced in FIG. 1 and the analysis operation 209 in FIG. 2. Before this operation initiates, query results are returned from the query operation 106 or the filter operation 207. Query results comprise a set of web pages for each query where the number of web pages in a set of web pages includes one or more web pages. From these query results, a first set of one or more web pages is selected in a select $1^{st}$ set of web pages operation 401. Any set of web pages may be selected first since the order of analysis does not matter so long as the keyword candidate used in the query that generated the set of web pages is linked to those web pages for purposes of keyword candidate summing. Selecting the first set of web pages may include accessing the one or more web pages if query results take the form of hyperlinks. In other words, the hyperlinks may be used to access the one or more web pages of the first set of web pages. Alternatively, the query operation 106 may provide an address of each web page to the analysis operation 108, 209. The select $1^{st}$ set of web pages operation 401 may then use this address to access the first set of web pages. In another embodiment, selecting may include accessing copies of the first set of web pages. In yet another embodiment, the $1^{st}$ set of web pages is accessed and copies of the one or more web pages are stored for future access.

From this first set of web pages a first web page is selected in a select $1^{st}$ web page from set operation 402. Selection of the $1^{st}$ web page may include accessing the first web page. A $1^{st}$ keyword candidate may also be selected in a select $1^{st}$ keyword candidate operation 404. Any keyword candidate that was used as an input to a query may be selected as the $1^{st}$ keyword candidate in this operation. The selected web page, in this case the $1^{st}$, is searched for the selected keyword candidate, in this case the $1^{st}$, in an identification decision 406.

If the keyword candidate appears in the $1^{st}$ web page, then the keyword candidate is assigned a presence score of 1 in a presence score=1 operation 408. If the keyword candidate does not appear in the web page, then the keyword candidate is assigned a presence score of 0 in a presence score=0 operation 410. A presence score is just a name given to a data value that represents whether or not the keyword candidate appears in the web page being searched. Other presence scores may also be used, such as A and B for instance, where A and B are two unequal numbers.

After the presence score has been assigned, the analysis operation 108, 209 decides whether the web page has been searched for all keyword candidates in a searched web pages for all keyword candidates decision 412. If the search has not used each keyword candidate, then the operation selects a next keyword candidate in a select next KC operation 414. The identification decision 406, the assignment of presence scores 408, 410, and the searched web pages decision 412 may then repeat until the $1^{st}$ web page has been searched for all keyword candidates.

When the searched web page decision 412 determines that the web page has been searched for all keyword candidates, the presence scores for the $1^{st}$ web page are added in a sum presence scores for web page operation 415. For instance, given three keyword candidates, Ace, Bat, and Car where Ace and Bat appear at least once in a web page, but Car does not, the sum presence scores operation 415 would return a sum of presence scores equal to 2 for that web page.

The analysis operation 108, 209 may also determine whether the keyword candidate search operations 408, 410, 414, 415 and decisions 406, 412 have been performed for all web pages in the $1^{st}$ set of web pages. This decision is performed in a searched all web pages in set decision 416. If this determination concludes that not all web pages have been searched, then the next web page is selected in a select next web page operation 418. The operations 404, 408, 410, 414, 415, 418 and decisions 406, 412, 416 repeat until all web pages in the $1^{st}$ set have been searched.

The searched all web pages in set decision 416 will then allow the presence scores for the set of web pages to be summed in a sum presence scores for web page set operation 420. In an embodiment the sum presence scores for web page set operation 420 sums the sum from each web page in the set. For instance, if a query using the keyword candidate Ace returns three web pages A, B, and C, the operation 415 may have generated sum of presence scores for these web pages as follows: A=2, B=1, C=1. The operation 420 would generate a sum of presence scores for the set of three web pages equal to 4 (sum for A+B+C or 2+1+1). In another embodiment, the operation 415 is not needed. As such, the operation 420 may sum the presence scores over all the web pages in the set instead of summing the sums from each web page in the set. This embodiment, basically integrates the function of operation 415 into the operation 420. For instance, if a query using the keyword candidate Ace returns three web pages A, B, and C, and a first keyword candidate appears at least once in A, at least once in B, zero times in C, and a second keyword candidate appears at least once in A, zero times in B, and at least once in C, then, then the sum of presence scores for the keyword candidate Ace would be 4. The two methods for performing the sum operation 420 that have just been discussed are not the only methods for performing the sum operation 420. For instance, the sum operation 420 may sum all presence scores in one continuous process regardless of what keyword candidate or web page the scores are associated with so long as presence score sums are linked to the keyword candidate that generated them. The sum operations 415 and 420 may be serially performed, performed in parallel, or a combination of the two. The operation 420 also assigns the sum of presence scores to the keyword candidate associated with the set of web pages being analyzed.

Once a sum of presence scores has been generated for the $1^{st}$ set of web pages, a generated sum for all web pages decision 422 determines whether other sets of web pages need to be analyzed. If all sets have not been analyzed, then a select next set of web pages operation 424 selects the next set of web pages, and the operations 402, 404, 408, 410, 414, 415, 418, 420, 424 and decisions 406, 412, 416, 422 are repeated until the generated sum for all web page sets decision 422 determines that a sum of presence scores has been generated for each set of web pages. At that point a sum of presence scores will have been assigned to every keyword candidate used to query the network in operation 106, and the one or more keyword candidates can then be ranked in a rank KCs by sum of presence scores operation 426. The ranking may be used to select one or more representative keywords in the selection operation 110.

This discussion of FIG. 4 assumed a sequentially looping method, however parallel and sequential-parallel combination embodiments are also possible. For instance, the rank KCs operation 426 may begin ranking keyword candidates before the analysis operation 108, 209 has completed analyzing all sets of web pages. Alternatively, each set of web pages may be analyzed simultaneously, each web page in a set may be analyzed simultaneously, and a web page may be simultaneously searched for all keyword candidates. Alternatively, all web pages in a set of web pages may be analyzed simultaneously while the sets of web pages are analyzed sequentially. Various other combinations and sequences of the disclosed operations can also be implemented. In these embodiments each set of web pages is associated with the keyword candidate used in the query that returned the set of web pages. Also, the presence score generated for a set of web pages is assigned to the keyword candidate used in the query that returned the set of web pages.

Figure 5:
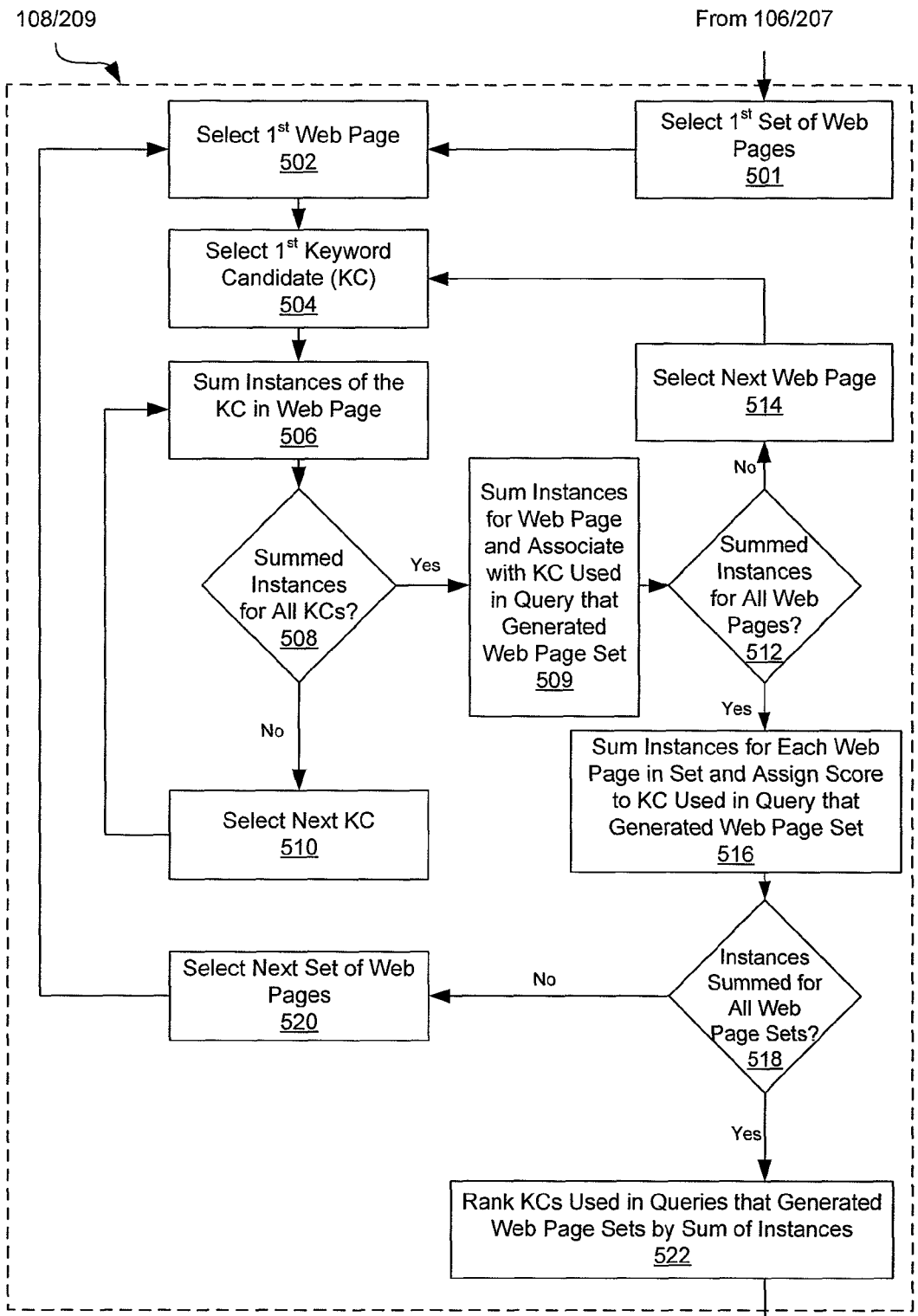
FIG. 5 illustrates an embodiment of a method for analyzing query results.

FIG. 5 illustrates an embodiment of a method for analyzing query results. The illustrated embodiment of analysis operation 108, 209 proceeds in the same manner as that illustrated in FIG. 4 until the $1^{st}$ keyword candidate is selected. At this point, instead of searching the $1^{st}$ web page for the $1^{st}$ keyword candidate and assigning a presence score, the analysis operation 108, 209 searches the $1^{st}$ web page for the $1^{st}$ keyword candidate and sums the total instances of the keyword candidate found in the $1^{st}$ web page. A decision 508 is then made as to whether a search and summation on the $1^{st}$ web page has been performed for all keyword candidates. If not, then the select next keyword candidate operation 510 selects the next keyword candidate and initiates another sum of the $1^{st}$ web page using this keyword candidate. Operations 506 and 510, and decision 508 will repeat until a sum of each keyword candidate appearing in the $1^{st}$ web page has been generated. The sum of instances for each keyword candidate in the $1^{st}$ web page, as generated by cycles of operation 506, 510 and decision 508, will then be summed in a sum instances operation 509.

The summed instances decision for all web pages 512 will then determine if all web pages in the $1^{st}$ set of web pages have seen the operations 504, 506, 509, 510 and decision 508 carried out. If not, then a next web page is selected in a select next web page operation 514 and the operations 504, 506, 509, 510, 514 and decisions 508, 512 repeat until all web pages in the set have been put through these operations. All sums for the set of web pages will then be added in a sum instances operation 516. If a sum of instances has not been generated for all sets of web pages then the instances summed decision 518 will trigger a select next set of web pages operation 520. The operations 502, 504, 506, 509, 510, 514, 516, 520 and decisions 508, 512, 518 will repeat until all sets of web pages have a sum of instances. The one or more keyword candidates that generated the query results in operation 106 may then be ranked based on these sums in a rank keyword candidates operation 522. The ranking may then be used to select representative keywords in the selection operation 110.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For example, given the embodiment of FIG. 5, instead of just summing instances of keyword candidates, the analysis operation 108, 209 may also assign different values to keyword candidates depending on where they are located. For instance, the operation 108 may find ten instances of a keyword candidate in a web page. In the embodiment of FIG. 5 this would produce a sum of instances equal to ten. However, in an embodiment, keyword candidates located in titles and headings may be counted twice, or given a score of two. So, if two of the ten keyword candidates were found in the title of the web page, then the sum of instances would equal twelve.

Numerous other changes may be made that will readily suggest themselves to those skilled in the art and which are encompassed in the spirit of the invention disclosed and as defined in the appended claims.

What is claimed is:

1. A method comprising:
receiving, by at least one computing device, a request for one or more advertisements contextually relevant to at least one web object;
selecting, by the at least one computing device and in response to the received request for one or more advertisements, one or more keywords from the at least one web object as search criteria to search for representative keywords of the at least one web object, at least one keyword from the at least one web object being selected based on a frequency of appearance of the keyword in the at least one web object;
performing, by the at least one computing device, at least one query, each query using at least one keyword of the one or more keywords selected from the at least one web object as criteria for the query to generate a set of search results satisfying the criteria;
analyzing, by the at least one computing device, each query's set of search results to determine an ability of each of the one or more keywords selected from the at least one web object to be representative of content of the at least one web object;
selecting, by the at least one computing device, at least one of the one or more keywords as being representative of the content of the at least one web object, each representative keyword is selected based on results of the analyzing of each query's set of search results; and
selecting, by the at least one computing device, the one or more contextually-relevant advertisements, each contextually-relevant advertisement that is selected having at least one representative keyword associated with it, each of the one or more contextually-relevant advertisements to be served for presentation at a user device in connection with the at least one web object.

2. The method of claim 1, the analyzing further comprising:
determining, by the at least one computing device, a sum of presence score for each keyword of the one or more keywords selected from the at least one web object, each sum of presence score is determined using each set of search results.

3. The method of claim 2, determining the sum of presence score for each keyword of the one or more keywords further comprising:
performing, for each set of search results:
determining, for each search result of the set of search results, a presence score for each keyword of the one or more keywords selected from the at least one web object, a keyword's presence score for a given search result indicating whether or not the keyword appears in the search result;
determining a presence score for each search result of the set of search results, the search result's presence score being determined using the presence score determined for each keyword of the one or more keywords selected from the at least one web object;
determining a presence score for the set of search results using the presence score determined for each search result of the set of search results; and
adding the presence score determined for the set of search results to the sum of the presence score for each keyword used as criteria in generating the set of search results.

4. The method of claim 2, determining the sum of presence score for each keyword of the one or more keywords further comprising:
performing, for each set of search results:
determining, for each search result of the set of search results, a number of instances of each keyword of the one or more keywords selected from the at least one web object;
determining a presence score for each search result of the set of search results, the search result's presence score being determined using the number of instances determined for each keyword of the one or more keywords selected from the at least one web object;
determining a presence score for the set of search results using the presence score determined for each search result of the set of search results; and
adding the presence score determined for the set of search results to the sum of the presence score for each keyword used as criteria in generating the set of search results.

5. The method of claim 2, selecting the one or more of the one or more keywords as being representative of the content of the at least one web object further comprising:
ranking, by the at least one computing device, the one or more keywords according to each keyword's respective sum of the presence; and
selecting, by the at least one computing device, the one or more of the one or more keywords as being representative of the content of the at least one web object using the ranking.

6. The method of claim 1, the performing at least one query further comprising using a search engine to perform the at least one query.

7. A system comprising:
comprising at least one computing system, each computing system comprising at least one processor and a storage medium for tangibly storing thereon program logic for execution by the at least one processor, the stored program logic comprising:
receiving logic executed by the at least one processor for receiving a request for one or more advertisements contextually relevant to at least one web object;
selecting logic for logic executed by the at least one processor for selecting, in response to the received request for one or more advertisements, one or more keywords from the at least one web object as search criteria to search for representative keywords of the at least one web object, at least one keyword of the one or more keywords being selected from the at least one web object based on a frequency of appearance of the keyword in the at least one web object;
performing logic executed by the at least one processor for performing at least one query, each query using at least one keyword of the one or more keywords selected from the at least one web object as criteria for the query to generate a set of search results satisfying the criteria;
analyzing logic executed by the at least one processor for analyzing each query's set of search results to determine an ability of each of the one or more keywords selected from the at least one web object to be representative of content of the at least one web object;
selecting logic executed by the at least one processor for selecting at least one of the one or more keywords as being representative of the content of the at least one web object, each representative keyword is selected based on results of the analyzing of each query's set of search results; and
selecting logic executed by the at least one processor for selecting the one or more contextually-relevant advertisements, each contextually-relevant advertisement that is selected having at least one representative keyword associated with it, each of the one or more contextually-relevant advertisements to be served for presentation at a user device in connection with the at least one web object.

8. The system of claim 7, the analyzing logic further comprising:
determining logic executed by the at least one processor for determining a sum of presence score for each keyword of the one or more keywords selected from the at least one web object, each sum of presence score is determined using each set of search results.

9. The system of claim 8, the determining logic executed by the at least one processor for determining the sum of presence score for each keyword of the one or more keywords further comprising:
performing logic executed by the at least one processor for performing, for each set of search results:
determining logic executed by the at least one processor for determining, for each search result of the set of search results, a presence score for each keyword of the one or more keywords selected from the at least one web object, a keyword's presence score for a given search result indicating whether or not the keyword appears in the search result;
determining logic executed by the at least one processor for determining a presence score for each search result of the set of search results, the search result's presence score being determined using the presence score determined for each keyword of the one or more keywords selected from the at least one web object;
determining logic executed by the at least one processor for determining a presence score for the set of search results using the presence score determined for each search result of the set of search results; and
adding logic executed by the at least one processor for adding the presence score determined for the set of search results to the sum of the presence score for each keyword used as criteria in generating the set of search results.

10. The system of claim 8, the determining logic executed by the at least one processor for determining the sum of presence score for each keyword of the one or more keywords further comprising:
performing logic executed by the at least one processor for performing, for each set of search results:
determining logic executed by the at least one processor for determining, for each search result of the set of search results, a number of instances of each keyword of the one or more keywords selected from the at least one web object;
determining logic executed by the at least one processor for determining a presence score for each search result of the set of search results, the search result's presence score being determined using the number of instances determined for each keyword of the one or more keywords selected from the at least one web object;
determining logic executed by the at least one processor for determining a presence score for the set of search results using the presence score determined for each search result of the set of search results; and
adding logic executed by the at least one processor for adding the presence score determined for the set of search results to the sum of the presence score for each keyword used as criteria in generating the set of search results.

11. The system of claim 8, the selecting logic executed by the at least one processor for selecting the one or more of the one or more keywords as being representative of the content of the at least one web object further comprising:
ranking logic executed by the at least one processor for ranking the one or more keywords according to each keyword's respective sum of the presence score; and
selecting logic executed by the at least one processor for selecting the one or more of the one or more keywords as being representative of the content of the at least one web object using the ranking.

12. The system of claim 7, the performing logic executed by the at least one processor for performing at least one query further comprising using a search engine for performing the at least one query.

13. A non-transitory computer-readable storage medium tangibly storing thereon computer-readable instructions to be executed by a computing device, the instructions comprising instructions to:
receive a request for one or more advertisements contextually relevant to at least one web object;
select, in response to the received request for one or more advertisements, one or more keywords from the at least one web object as search criteria to search for representative keywords of the at least one web object, at least one keyword of the one or more keywords being selected from the at least one web object based on a frequency of appearance of the keyword in the at least one web object;
perform at least one query, each query using at least one keyword of the one or more keywords selected from the at least one web object as criteria for the query to generate a set of search results satisfying the criteria;
analyze each query's set of search results to determine an ability of each of the one or more keywords selected from the at least one web object to represent content of the at least one web object;
select at least one of the one or more keywords as being representative of the content of the at least one web object, each representative keyword is selected based on results of the analyzing of each query's set of search results; and
select the one or more contextually-relevant advertisements, each contextually-relevant advertisement that is selected having at least one representative keyword associated with it, each of the one or more contextually-relevant advertisements to be served for presentation at a user device in connection with the at least one web object.

14. The non-transitory computer-readable storage medium of claim 13, the instructions to analyze further comprising instructions to:
determine a sum of presence score for each keyword of the one or more keywords selected from the at least one web object, each sum of presence score is determined using each set of search results.

15. The non-transitory computer-readable storage medium 14, the instructions to determine the sum of presence score for each keyword of the one or more keywords further comprising instructions to:
   perform, for each set of search results, instructions to:
      determine, for each search result of the set of search results, a presence score for each keyword of the one or more keywords selected from the at least one web object, a keyword's presence score for a given search result indicating whether or not the keyword appears in the search result;
      determine a presence score for each search result of the set of search results, the search result's presence score being determined using the presence score determined for each keyword of the one or more keywords selected from the at least one web object;
      determine a presence score for the set of search results using the presence score determined for each search result of the set of search results; and
      add the presence score determined for the set of search results to the sum of the presence score for each keyword used as criteria in generating the set of search results.

16. The non-transitory computer-readable storage medium 14, the instructions to determine the sum of presence score for each keyword of the one or more keywords further comprising instructions to:
   perform, for each set of search results, instructions to:
      determine, for each search result of the set of search results, a number of instances of each keyword of the one or more keywords selected from the at least one web object;
      determine a presence score for each search result of the set of search results, the search result's presence score being determined using the number of instances determined for each keyword of the one or more keywords selected from the at least one web object;
      determine a presence score for the set of search results using the presence score determined for each search result of the set of search results; and
      add the presence score determined for the set of search results to the sum of the presence score for each keyword used as criteria in generating the set of search results.

17. The non-transitory computer-readable storage medium 14, the instructions to select the one or more of the one or more keywords as being representative of the content of the at least one web object further comprising instructions to:
   rank the one or more keywords according to each keyword's respective sum of the presence score; and
   select the one or more of the one or more keywords as being representative of the content of the at least one web object using the ranking.

18. The non-transitory computer-readable storage medium 13, the instructions to perform at least one query further comprising instructions to use a search engine to perform the at least one query.

* * * * *